(12) United States Patent
Schnorr

(10) Patent No.: US 9,000,908 B2
(45) Date of Patent: Apr. 7, 2015

(54) VEHICLE FUSE AND BRAKE LIGHT MONITOR

(71) Applicant: Christopher T. Schnorr, New Hill, NC (US)

(72) Inventor: Christopher T. Schnorr, New Hill, NC (US)

( * ) Notice: Subject to any disclaimer, the term of this patent is extended or adjusted under 35 U.S.C. 154(b) by 356 days.

(21) Appl. No.: 13/719,783

(22) Filed: Dec. 19, 2012

(65) Prior Publication Data
US 2014/0167951 A1 Jun. 19, 2014

(51) Int. Cl.
*B60Q 11/00* (2006.01)
*B60Q 1/00* (2006.01)

(52) U.S. Cl.
CPC ........................ *B60Q 1/00* (2013.01)

(58) Field of Classification Search
None
See application file for complete search history.

(56) References Cited

U.S. PATENT DOCUMENTS

| 3,840,276 | A | | 10/1974 | Jebunville | |
|---|---|---|---|---|---|
| 5,561,580 | A | * | 10/1996 | Pounds et al. | 361/104 |
| 6,218,952 | B1 | * | 4/2001 | Borland et al. | 340/641 |
| 8,686,596 | B2 | * | 4/2014 | Huss et al. | 307/86 |
| 2006/0017540 | A1 | | 1/2006 | Smith | |
| 2011/0140902 | A1 | * | 6/2011 | Huss et al. | 340/638 |

OTHER PUBLICATIONS

Intersil, Application Note 1567, ISL28005, ISL28006 Unidirectional Current Sense Amplifiers, AN1567.0, Intersil Americas Inc., May 25, 2010.
Silicon Labs, C8051F340, USB, 48 MIPS, 64 kB Flash, 10-Bit ADC, 48-Pin Mixed-Signal MCU, Silicon Laboratories, Apr. 8, 2009.
Electronic Circuits Design for Beginners—Chapter 17, Learn electronics as a hobby, for industrial and home automation, http://knil.google.com/k/max-iskram/electronic-circuits-design-for/1f4zs8p9zgq0e/29, Oct. 10, 2011.
National Semiconductor, LM1946 Over/Under Current Limit Diagnostic Circuit, National Semiconductor Corporation, Feb. 1993.
Opto-Coupled Devices, Opto Triacs and Solid State Relays, http://www.learnabout-electronics.org/ssr_01.php, Jul. 24, 2012.

* cited by examiner

*Primary Examiner* — Travis Hunnings
(74) *Attorney, Agent, or Firm* — James G. Passé; Passé Intellectual Property, LLC

(57) ABSTRACT

The present invention relates to a device in a motor vehicle having a system for monitoring the active status of vehicle light bulbs such as brake light bulbs and the corresponding light fuse and reporting the status to a vehicle driver.

9 Claims, 2 Drawing Sheets

VEHICLE FUSE AND BRAKE LIGHT MONITOR

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method for detecting when a vehicle brake light is not functioning due to either a brake light bulb burning out or the fuse blowing that controls the electrical circuit for the brake lights. In particular, the invention relates to a Microcontroller Unit (MCU) functionally controlling the circuit between a vehicle's brake lights and the fuse controlling the light bulbs.

2. Description of Related Art

Motor vehicles such as cars, trucks, sport vehicles, or the like all have safety lights such as turn signals, brake lights, running lights, and parking lights each with one or more light bulbs. These lights are controlled from the inside and normally have a replaceable or electronic fuse that is a safety mechanism in the electrical system. The inability to know if a light is out and if it is out is it due to the light bulb burning out or the fuse blowing while the vehicle is being operated is a common problem experienced by all vehicle operators.

It is clear that the inoperability of the light bulb in these lights can create a hazardous and illegal driving situation. Frequently, the only way to manually check brake lights is to have a second person stand outside the vehicle while the brake pedal is pressed and to get down on ones hands and knees to check fuses.

Accordingly, some attempts have been made to provide electronic indication. In patent application 2006/0017540, there is a dual bipolar LED indicator light circuit connected between the blades of a blade fuse. When the fuse blows, an LED lights up on the device to indicate a blown fuse. The device only deals with the fuse and requires visual access to the fuse box to see the LED. Frequently, the fuse box is sealed making visualization impossible, not to mention that there is little or no room to utilize the device.

In U.S. Pat. No. 6,218,952 issued Apr. 17, 2001 there is a system for detecting a blown light system in a trailer being pulled by a vehicle by monitoring a decrease in the current level as a key parameter for determining if there has been a failure in the light signal circuit. It cannot detect the difference between a blown fuse and a blown light bulb.

BRIEF SUMMARY OF THE INVENTION

The present relation relates to a system for detecting both a blown fuse and nonfunctioning brake lights in a motor vehicle. In particular, it relates to use of optoisolators, current sensors, and microprocessors to detect blown fuses and blown brake light bulbs in a vehicle and notify the vehicle operator.

Accordingly, in one embodiment of the invention, there is a monitoring system for monitoring the function of a plurality of brake lights, and their corresponding fused light circuits and their corresponding fuse and fuse circuit on a vehicle, the circuit having a positive and negative power line comprising:

a. one or more optoisolators each connected to a different power line for monitoring the fuse circuits to determine if a fuse is operating and reporting the status of the fuses to a microprocessor wherein when there is only one optoisolator it is connected to a positive line and not an open power line;

b. a current detector connected to one of the power lines and reporting the current of the fused light circuit to the microprocessor;

c. a microprocessor for receiving a report from the one or more optoisolators, to determine if the fuse is blown, and receiving a report from the current detector, the microprocessor set for a maximum current to compare to the current detector to determine if each of the plurality of lights is functioning; and d. a vehicle readout for taking the information about the fuses and lights from the microprocessor and reporting to a vehicle driver.

DETAILED DESCRIPTION OF THE INVENTION

Figure 1:
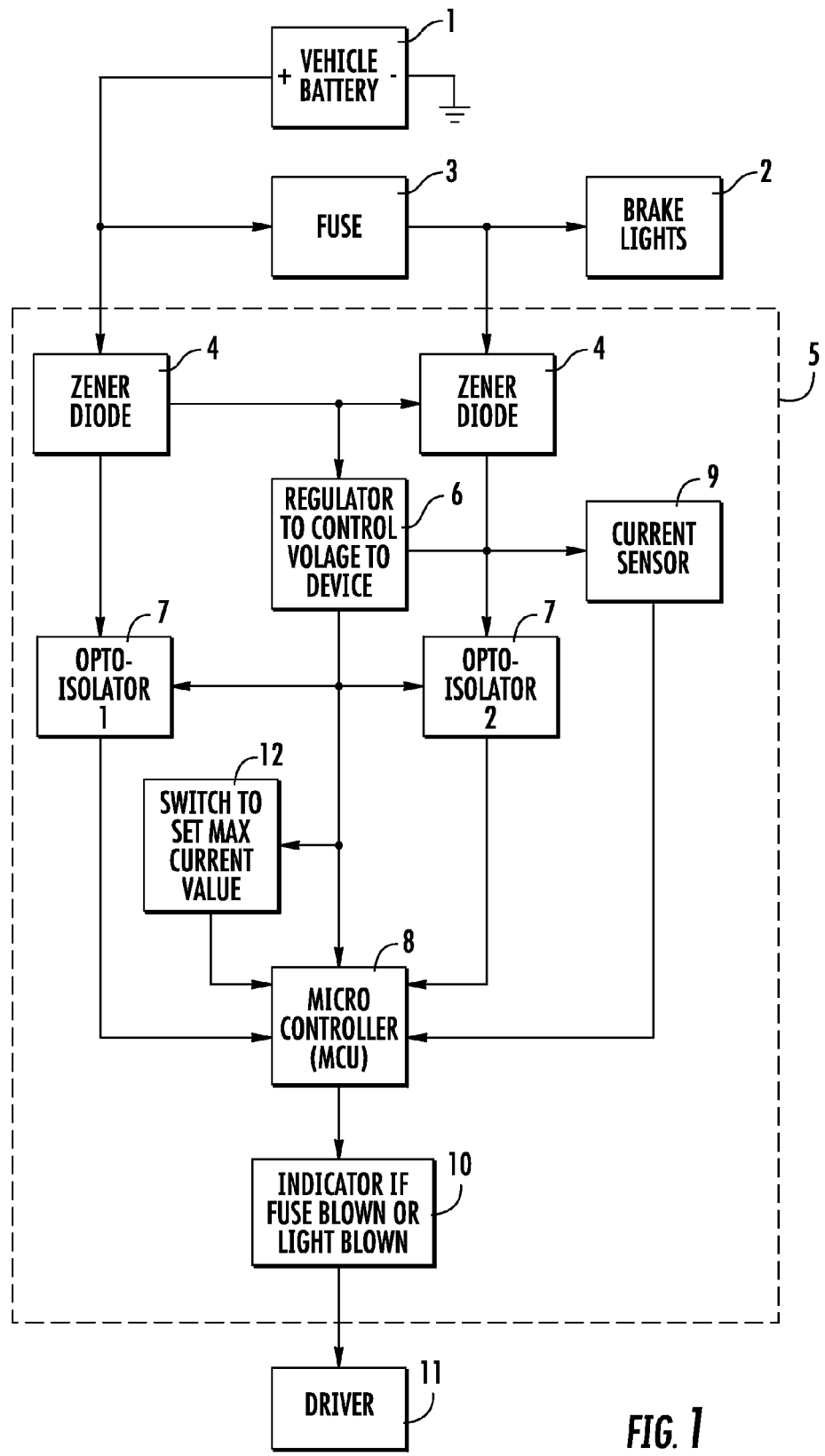
FIG. 1 is a system chart of the operation of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

As used herein "plurality of lights" refers to the lights on a vehicle that are operated by the vehicle battery and fused to prevent damage by line voltage spikes. This includes, but is not limited to brake lights, headlights, tail lights, parking lights, running lights, interior lights, dash lights, lights from an added trailer, and all other lights on the vehicle. In one embodiment, it refers to brake lights. Many of these lights occur in pairs such in the case of head lights but each light receives power separately and can/will be separately monitored. As used herein "vehicle" refers to motorized vehicle of any kind that uses lights such as cars, trucks, planes, trains, golf carts, motorcycles, and the like.

As used herein "corresponding light circuits" refers to the wiring to/from the plurality of lights with one circuit wiring for each light. Each of the plurality of lights is tied together in line with a fuse. Usually, a single fuse is utilized for all brake lights. In most cases, a plurality of lights is controlled by each fuse in the vehicle. Therefore, there may be a single fuse for the headlights and one for the brake lights and the like. The fuse in the vehicle is the standard vehicle fuse for which a positive and negative line from the battery is utilized and one skilled in the art understands vehicle fuses and their use. The fuse is positioned in-between the vehicle battery and the light(s) on that particular circuit. In a typical vehicle, the whole vehicle lighting circuit comprises the battery to the fuse to the light with switches in most cases for turning lights on and off.

As used herein an "optoisolator" is a device utilized to isolate the input from the output. This is normally utilized for use between high and low voltage situations but in the present invention it is utilized to isolate the voltage/amperage from the fuse in a manner that can identify if there is a disconnect at the fuse in the fuse circuit. The optoisolator is positioned in the circuit in-between the fuse and the microprocessor. The optoisolator can report the status of the circuit to the microprocessor and the microprocessor can interpret and send information to a readout to let the vehicle driver know if the fuse is blown or not. In one embodiment, two optoisolators are used, one for each side of the fuse. It does not matter which is "hot" and which is open since if the fuse blows one of the optoisolators will detect no voltage. As an example, a Motorola Moc 3010 could be used.

As used herein the term "current detector" is a device which measures the current flow, for example, when one steps on the brake and all the bulbs for brake lights are lit. A particular current draw would indicate all bulbs lit. Less than the set maximum current would indicate one or more bulbs are out. The maximum can be preset in the microprocessor or a switch can be engaged to let the microchip know its current value is the maximum. In one embodiment the microchip is a microprocessor. Therefore one could step on the brake with all brake lights lit and then the microprocessor would know that is the maximum value when all lights are functioning. The microprocessor could compare this maximum value to the value generated each time the brakes are applied and if they are less, factoring in a current tolerance, a bulb is out. In one embodiment, a current sensor device is used with an op/amp such as for example an Intersil ISL28005/28006 which sends a signal to the microprocessor to tell it what the current draw is.

The microprocessor used herein is utilized for receiving and storing the reports from the one or more optoisolators and processing the information to report the status of the fuse. Likewise, the microprocessor receives the circuit of each of the plurality of the lights from the current detector and indirectly measures the amperage of the circuit to determine if a light is blown based on changes (decreases) in amperage from a predetermined maximum. Likewise, the results of the test are then reported to the vehicle driver via the vehicle readout from the microprocessor. Microprocessors are well known in the art and one skilled in the art could determine which microprocessor to select based on the disclosure here, for example, a Silicon Labs 8051, or a Renasas H8. The microprocessor would be programmed to make comparison values of amperage, to take info from the optoisolator, and compute based on that information the status of fuses and lights in the vehicle.

As used herein the "vehicle readout" refers to a device that takes information from the microprocessor and reports to the vehicle driver the status of the fuses and the status of the lights of the vehicle. In one embodiment, the readout is an electronic digital read out which gives an indicator such as a light, sound, number, or letters to the vehicle driver to indicate the fuse/light's status. In one embodiment, the notification is one or more "idiot" lights. In one embodiment, the microprocessor output is a USB output and the readout is a USB input.

Because electronics normally work at 3.3 volts and most vehicles work at 12 volts, in one embodiment, a regulator is used to step down the voltage from the vehicle voltage to the voltage of the electronics being used. While each of the electronics can be separate, the electronics can all be on the same chip or portions of the system can be hard wired on the same chip. For example, Silicon Labs produce a USB microprocessor with an opto-triac and a regulator (e.g. part number C8051F340).

In use of the invention, the system can be an aftermarket product sold separately or be hard wired into the vehicle. The aftermarket product would have to be either hand wired into the vehicle or plug into the fuse panel where the fuse controlling the light would go.

Now referring to the drawings, FIG. 1 is a block diagram of the system of the present invention. Vehicle battery 1 is used to power a vehicle and tail lights 2 (such as a brake light) and the device of the present invention. One or more fuses 3 are wired in-between the battery 1 and the lights 2 to prevent circuit overload. The zener diodes 4 are positioned to provide voltage flow in one direction only. If the fuse 3 blows, the zener diodes 4 allow voltage to be maintained for voltage regulation 6. The monitoring system 5 has optional voltage regulator 6 to control the voltage coming from the battery 1 and the electronics of the system 5. The optoisolator 7 receives a circuit from the fuse 3 and regulator 6 and reports to the microprocessor 8 the status of the fuse as functional or non-functional. Meanwhile, the microprocessor 8 is also wired to the current sensor 9 and monitors the status of the lights. The status of both the lights and the fuse is then outputted to vehicle readout 10 for reporting to the vehicle driver. Optionally the maximum current can be taught to microprocessor 8 via switch 12 which when pressed and brake depressed causes value of current at that moment to be retained as the maximum current for the circuit.

Figure 2:
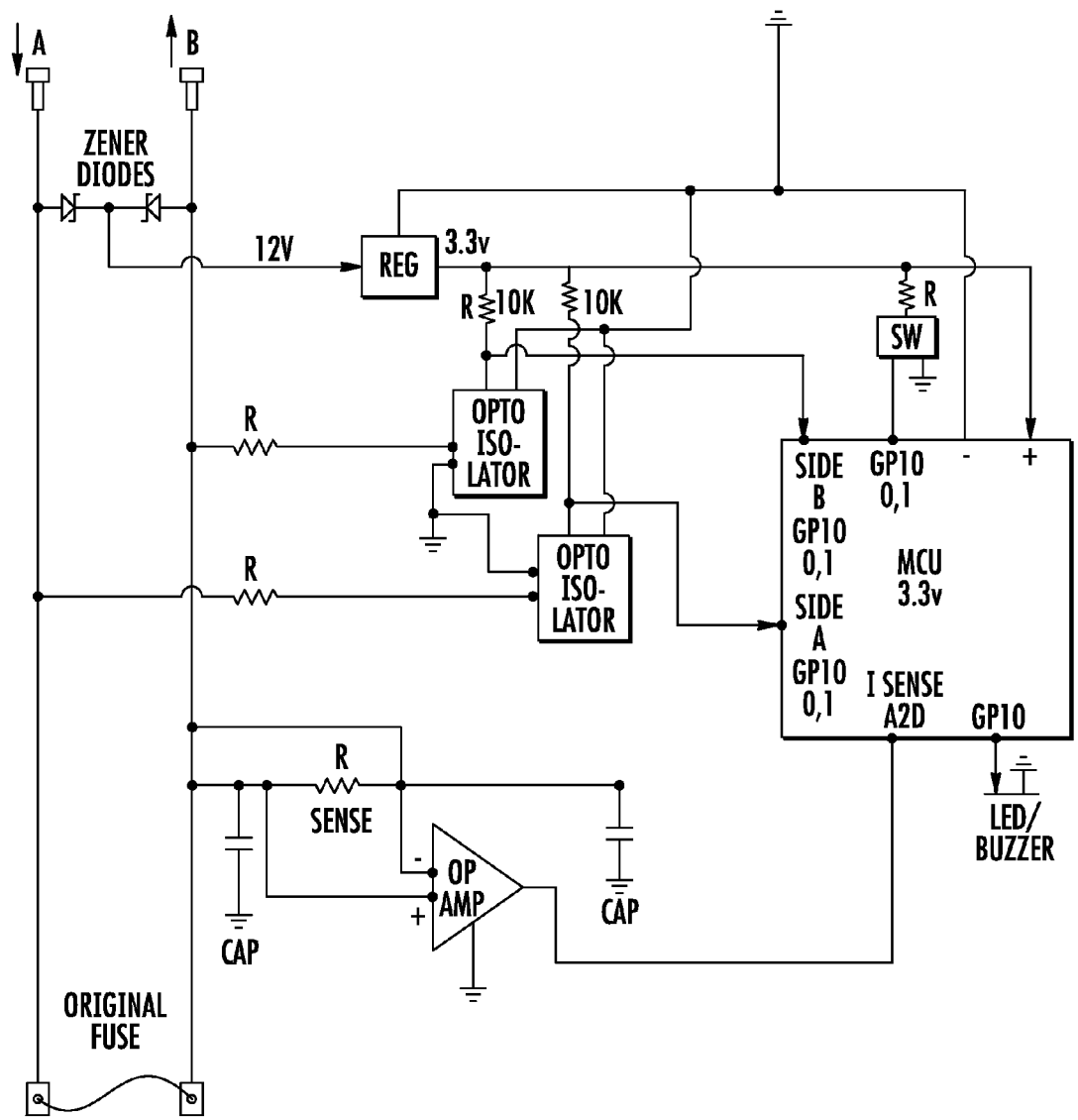
FIG. 2 is a schematic example of the present invention system.

FIG. 2 is a schematic of an embodiment of a system of the present invention showing the opto-triacs 7 the regulator 6 and the microprocessor 8. In addition, zener diodes, current sense circuit, fuse, switch, indicator as discussed above.

What is claimed is:

1. A monitoring system for monitoring the function of a plurality of lights, and their corresponding fused light circuits and their corresponding fuse and fuse circuit on a vehicle the circuit having a positive and negative power line comprising:
 a) one or more optoisolators each connected to a different power line for monitoring the fuse circuits to determine if a fuse is operating and reporting the status of the fuses to a microprocessor wherein when there is only one optoisolator it is connected to positive line and not an open line;
 b) a current detector connected to one of the power lines and reporting the current status of the fused light circuit to the microprocessor;
 c) a microprocessor for receiving a status report from the one or more optoisolators, to determine if the fuse is blown, and receiving a report from the current detector, the microprocessor set for a maximum current to compare to the current detector to determine if each of the plurality of lights is functioning; and
 d) a vehicle readout for taking the status information about the fuses and lights from the microprocessor and reporting to a vehicle driver.

2. The monitoring system according to claim 1 which further comprises a regulator to regulate the voltage from a vehicle battery to any electronic parts of the system needing a voltage different than the vehicle battery.

3. The monitoring system according to claim 2 wherein the regulator steps 12 volts down to 3.3 volts.

4. The monitoring system according to claim 1 wherein the readout is a digital status readout.

5. The monitoring system according to claim 1 wherein the readout is a warning light which lights if a fuse is blown or a light is out.

6. The monitoring system according to claim 1 wherein there is at least one diode wired to allow a regulator to take power from either power line.

7. The monitoring system according to claim 1 wherein the maximum current on the microprocessor is settable by the user or preset.

8. The monitoring system according to claim 1 wherein the lights are two are more vehicle brake lights.

9. The monitoring system according to claim 1 wherein there is one optoisolator for each fuse being monitored.

\* \* \* \* \*